(12) United States Patent
Ebato

(10) Patent No.: US 7,791,644 B2
(45) Date of Patent: Sep. 7, 2010

(54) SHAKE-AMOUNT DETECTING DEVICE AND IMAGING DEVICE

(75) Inventor: Takashi Ebato, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 563 days.

(21) Appl. No.: 11/892,858

(22) Filed: Aug. 28, 2007

(65) Prior Publication Data
US 2008/0049108 A1  Feb. 28, 2008

(30) Foreign Application Priority Data
Aug. 28, 2006  (JP) .............................. 2006-230337

(51) Int. Cl.
*H04N 5/228* (2006.01)
*G03B 17/00* (2006.01)
(52) U.S. Cl. .............................. 348/208.2; 348/208.99; 348/208.4; 348/208.5; 348/208.7; 396/52; 396/54; 396/55
(58) Field of Classification Search ........................ 348/ 208.99–208.16; 396/52–55
See application file for complete search history.

(56) References Cited
U.S. PATENT DOCUMENTS
5,890,018 A * 3/1999 Terui ............................ 396/53

7,339,612 B1 * 3/2008 Yajima ..................... 348/208.7
7,460,772 B2 * 12/2008 Ishikawa et al. ............. 396/52
7,593,040 B2 * 9/2009 Shan et al. ............. 348/208.99

FOREIGN PATENT DOCUMENTS
| JP | 5-137048 A | 6/1993 |
| JP | 5-249529 A | 9/1993 |
| JP | 2000-221039 A | 8/2000 |

* cited by examiner

*Primary Examiner*—Lin Ye
*Assistant Examiner*—Chia-Wei A Chen
(74) *Attorney, Agent, or Firm*—Sughrue Mion, PLLC

(57) ABSTRACT

When a camera body is shaken, a piezoelectric element generates a signal corresponding to angular velocity. The output signal of the element is amplified by a synchronous detection amplifier and is sent to a high-pass filter. An output signal of the filter is integrated after digital conversion and is outputted as a shake amount of the camera body. An initialization-trigger generating circuit generates an initialization trigger in predetermined cycles. When the trigger is inputted, the amplifier outputs a first zero-level signal. A zero-level initialization circuit initializes the filter every input of the trigger to output a second zero-level signal. The two zero-level signals have a reference signal value to be outputted at a time of the angular velocity zero. During the initialization, the reference signal value is applied to both sides of the filter to remove drift components included in the output signal thereof.

14 Claims, 13 Drawing Sheets

SHAKE-AMOUNT DETECTING DEVICE AND IMAGING DEVICE

FIELD OF THE INVENTION

The present invention relates to a shake-amount detecting device and an imaging device using the same.

BACKGROUND OF THE INVENTION

Some of imaging devices of an electronic camera and so forth detect a shake state of a camera body (housing) to perform correction for counteracting a shake thereof. In particular, it is general to perform optical shake correction in which a taking lens and an image sensor are moved so as to counteract the shake, such as described in Japanese Patent Laid-Open Publication Nos. 5-249529, 5-137048 and 2000-221039 for instance.

In a camera provided with such an optical shake-correction function, angular information of the shake is produced by time integration of angular velocity detected from a shake detector detecting the shake of the camera body. A lens drive signal is outputted in accordance with the angular information to move a correction lens. By virtue of this, an imaging optical axis is deflected to offset the shake.

By the way, the above-described shake detector is generally provided with an angular-velocity sensor of a gyro sensor and so forth. This kind of the angular-velocity sensor converts a force of mechanical torsion into an electromotive force by a piezoelectric element to perform the detection. Consequently, an output level is small and error is likely to be caused due to increased temperature. Further, since an output signal often includes components of offset and drift, detection accuracy deteriorates depending on usage environment. In consideration of this, the electronic camera described in the above-noted Publication No. 5-249529 performs differential amplification of a reference voltage and an output of a vibration detecting sensor at a power-on time. In accordance with the output for which the differential amplification has been performed, the reference voltage is increased or decreased. In this way, the drift component caused in the vibration detecting sensor at the power-on time is removed.

Meanwhile, the camera described in the above-noted Publication No. 5-137048 compares a detection result of the gyro sensor with a predetermined condition. In accordance with a comparison result, a detector including the gyro sensor is initialized. In other words, when a power supply is turned on just after panning and just after largely changing a direction of a tilt or a pan, the detected shake amount becomes an extremely large value because the gyro sensor outputs the shake state of this time. On the other hand, when a temperature changes during usage, a shift of the reference voltage is caused. In such a case an extreme value has been outputted as the shake amount, error detection is prevented by initializing the sensor.

As to an oscillation gyro described in the above-noted Publication No. 2000-221039, the gyro sensor includes an angular velocity sensor, an A/D converter for digitally converting an output of the angular velocity sensor, and a digital signal processor for processing a digital signal outputted from the A/D converter. When the drift is caused on the digital signal based on the output of the angular velocity sensor, the drift component is corrected by an operation performed in the gyro sensor.

However, in the structure of the Publication No. 5-249529, when the camera body is extremely shaken at the power-on time, the reference voltage is changed in accordance with the output of the vibration detecting sensor of that time. Due to this, the shake state is mistakenly detected when the camera body comes to rest. In the structure of the Publication No. 5-137048, when the camera body is slightly shaken in a direction of tilt or pan, initialization is not performed. Due to this, components of offset and drift are added to the output signal for a while. In the structure of the Publication No. 2000-221039, if the drift components are corrected when the body has been changed from the shake state to the still state, a value of the shake state is regarded as a center value and sometimes the still state is mistakenly detected as the shake state.

SUMMARY OF THE INVENTION

In view of the foregoing, it is a primary object of the present invention to provide a shake-amount detecting device and an imaging device in which a shake amount of a housing caused by a shake and so force is detectable with great accuracy.

In order to achieve the above and other objects, the present invention comprises an angular velocity sensor for generating a signal corresponding to an angular velocity of the housing, an initialization-trigger generating circuit for generating an initialization trigger in predetermined cycles, a synchronous detection amplifier for amplifying the signal of the angular velocity sensor, a high-pass filter for performing filter processing of the signal outputted from the synchronous detection amplifier, and a zero-level initialization circuit. An A/D converter converts the signal outputted from the high-pass filter, into a digital signal. An integral processing circuit integrates the digital signal to output a shake amount of the housing.

The synchronous detection amplifier outputs a first zero-level signal upon an input of the initialization trigger. The zero-level initialization circuit initializes the high-pass filter every input of the initialization trigger to output a second zero-level signal from the high-pass filter. During the initialization of the high-pass filter, an input side and an output side are set to zero level. Thus, drift components included in the output signal of the high-pass filter are removed.

The first zero-level signal and the second zero-level signal have a reference signal value to be outputted at a time when the angular velocity is zero. The reference signal value is substantially a center value of an output range of the synchronous detection amplifier.

The high-pass filter includes a capacitor connected to the synchronous detection amplifier, a reference supply for generating a first reference voltage, and a resistance connected between the capacitor and the reference supply. A signal generated at a connection point of the resistance and the capacitor is inputted into the A/D converter. At this connection point, the second zero-level signal is generated when the high-pass filter is initialized.

The zero-level initialization circuit includes a switch connected to the resistance in parallel. The switch is turned on during the input of the initialization trigger to short-circuit the resistance. At the connection point, the first reference voltage is generated as the second zero-level signal.

An input side of the synchronous detection amplifier is connected to a selector switch circuit, which selects one of the first signal of the piezoelectric element and a second reference voltage of a reference-voltage output unit. The selected one is inputted into the synchronous detection amplifier. When the second reference voltage is inputted, the synchronous detection amplifier outputs the first zero-level signal.

The A/D converter is synchronized with the initialization trigger and performs the digital conversion processing just after the output of the second zero-level signal of the high-pass filter has been stopped.

A preferred embodiment of the present invention includes a gyro sensor, a sensor external processing circuit and a system controller. The gyro sensor has the initialization-trigger generating circuit, the angular velocity sensor and the synchronous detection amplifier. The sensor external processing circuit has the high-pass filter and the zero-level initialization circuit. The system controller has the A/D converter and the integral processing circuit.

In another preferred embodiment of the present invention, the gyro sensor has the angular velocity sensor and the synchronous detection amplifier. The sensor external processing circuit has the high-pass filter and the zero-level initialization circuit. The system controller has a timing control circuit, the A/D converter and the integral processing circuit. The timing control circuit generates a timing signal for performing the digital conversion processing of the A/D converter. In addition, the timing control circuit works as the initialization-trigger generating circuit for generating the initialization trigger.

It is preferable that the timing control circuit generates the timing signal differently from the initialization trigger. Further, the timing control circuit may generate the timing signal to perform the digital conversion processing after the high-pass filter has been initialized by the generation of the initialization trigger and just after the output of the second zero-level signal of the high-pass filter has been stopped.

The imaging device of the present invention includes an imaging optical system having a correction lens capable of moving in a direction perpendicular to an optical axis, a lens-position detector for detecting a position of the correction lens, and a lens drive controller for moving the correction lens. The lens drive controller calculates a difference between a target position and a lens position. The target position corresponds to the shake amount of the camera body outputted from the integral processing circuit. The lens position is detected by the lens-position detector. The lens drive controller moves the correction lens so as to make the difference zero. By moving the correction lens, an image comes to rest on an imaging surface even if a shake of the camera body is caused.

According to the present invention, the high-pass filter is initialized whenever the initialization trigger is inputted. During the initialization, the input side and the output side of the high-pass filter are set to the zero level. In other words, the reference signal value is applied to both electrodes of the capacitor to set the angular velocity in a zero state so that drift components and so forth included in the output signal of the high-pass filter are removed and the shake amount of the housing caused by hand movement and the like is detected with great accuracy.

DESCRIPTION OF THE PREFERRED EMBODIMENTS

Figure 1:
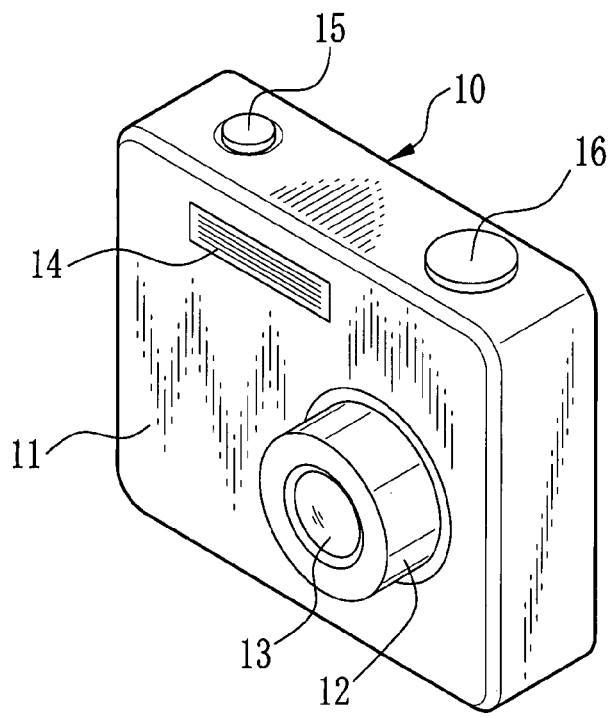
FIG. 1 is a perspective view showing a front side of an electronic camera.

In FIG. 1 showing an embodiment of the present invention, a camera body (case) 11 of an electronic camera 10 is provided with a collapsible lens barrel 12 disposed at a front side thereof. The lens barrel 12 holds a taking lens 13 of a zoom lens. Further, a flash emitter 14 is disposed at a front-upper portion of the camera body 11.

A top side of the electronic camera 10 is provided with a shutter button 15 and an operation dial 16, which turns on and off a power switch and changes a still-image shooting mode, a moving-image shooting mode, a reproduction mode and a setting mode. Incidentally, in the moving-image shooting mode, it is possible to record a moving image of up to three minutes, for example, by continuously taking still images at a speed of thirty frames per second.

Figure 2:
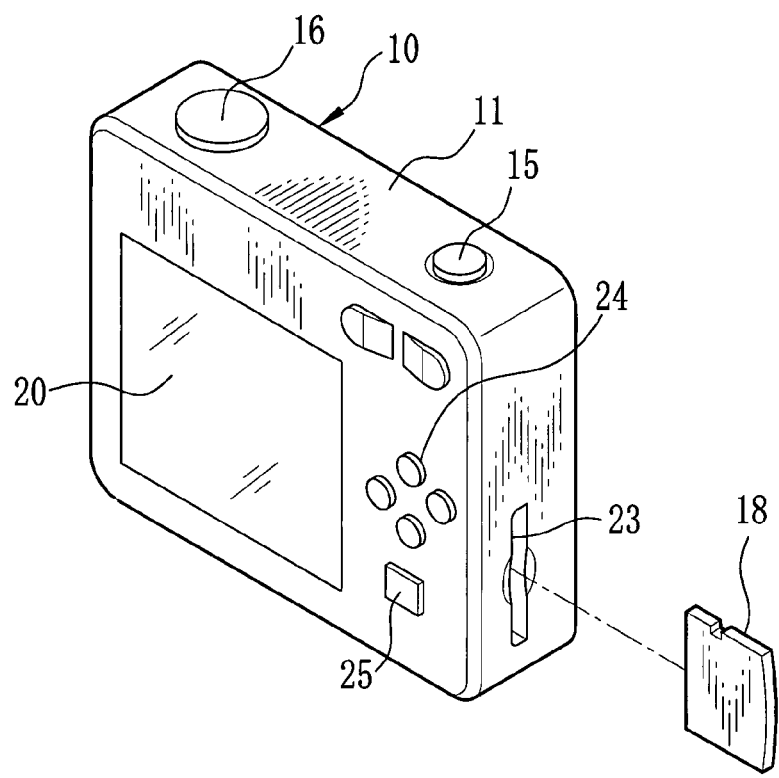
FIG. 2 is a perspective view showing a rear side of the electronic camera.

In FIG. 2, a rear side of the electronic camera 10 is provided with a liquid crystal panel (LCD) 20. In the respective shooting modes of the still image and the moving image, the LCD 20 acts as an electronic viewfinder to display a through image in real time. In the reproduction mode, the LCD 20 reads image data of the still image and the moving image stored in a memory card 18 to reproduce the still image and the moving image. In the setting mode, the LCD 20 displays various kinds of setting screens.

The memory card 18 is removably loaded into a memory card slot 23 formed in a lateral side of the electronic camera 10. The image data obtained in the shooting mode is stored in the memory card 18. Meanwhile, a cursor button 24 is used for a changeover of various kinds of settings and for an operation performed on various kinds of process confirmation screens displayed on the LCD 20. A determination button 25 is used for executing the process selected by the cursor button 24.

Figure 3:
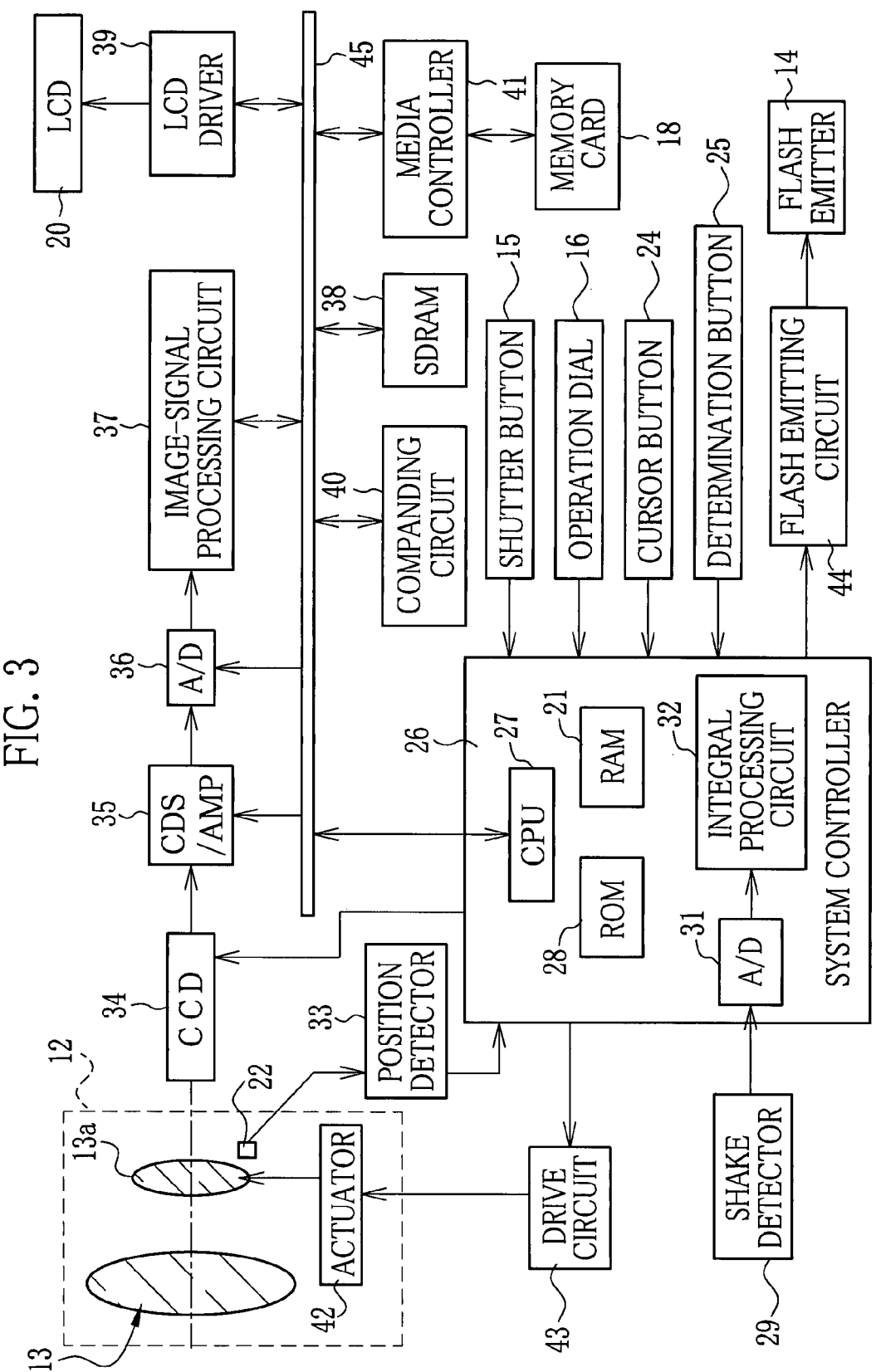
FIG. 3 is a block diagram showing an electrical structure of the electronic camera.

In FIG. 3 showing an electrical structure of the electronic camera 10, a system controller 26 is mainly composed of a CPU 27 to integrally control the respective parts of the electronic camera 10 on the basis of various programs of image shooting, recording, reproduction, erasure, data transfer and so forth in accordance with operation signals generated by operating the shutter button 15, the operation dial 16, the cursor button 24 and the determination button 25. The controller 26 comprises a ROM 28 and a RAM 21 working as a storage member. The ROM 28 stores various kinds of sequence programs, data for control, and so forth. The RAM 21 temporarily stores working data.

The system controller 26 further comprises an A/D converter 31 and an integral processing circuit 32. Into the A/D converter 31, is inputted a signal corresponding to an angular velocity of the camera body 11 detected by a shake detector 29 described later. The A/D converter 31 digitally converts the inputted signal. The integral processing circuit 32 performs time integration for the digitally-converted signal. Based on an arithmetic value of the integral processing circuit 32, a shake amount of the electronic camera 10 is detected. By the way, a shake-amount detecting device 30 of this embodiment comprises the system controller 26 and the shake detector 29. The shake-amount detecting device 30 is adapted to be built in a housing, which is the electronic camera 10 or the lens barrel for example.

Behind the taking lens 13, a CCD 34 is disposed. In displaying the through image, a pickup signal of a field image (even field or odd field) is read from the CCD 34. The read pickup signal is inputted into a CDS/AMP circuit 35.

The CDS/AMP circuit 35 comprises a correlation double sampling circuit (CDS) and an amplifier (AMP). The CDS produces analog image signals of R, G and B from the pickup signal outputted by the CCD 34. The AMP amplifies the analog image signals of R, G and B. An A/D converter 36 converts the analog image signal outputted from the CDS/AMP circuit 35 into image data of the digital image signal.

The image data outputted from the A/D converter 36 is inputted into an image-signal processing circuit 37 for performing image processes of gradation conversion, white balance correction, gamma correction, YC conversion processing and so forth. After performing the image processes, the image data is temporarily stored in an SDRAM 38 through a data bus 45 and is sent to the LCD 20 via the LCD driver 39 to display the through image. In the SDRAM 38, there are memory areas for the through image and for storing successive two field images. While reading is performed relative to one of the memory areas, writing is performed relative to the other thereof.

While the through image is displayed, AF control and AE control are performed at regular time intervals. During the AF control, a focus lens composing the taking lens 13 is moved to detect a focal position where contrast (a value obtained by integrating a difference of adjacent pixels) becomes the maximum. The focus lens is set to the detected focal position. During the AE control, a stop of the taking lens 13 is changed.

Upon depressing the shutter button 15 halfway (turning on a switch S1), AE photometry is commenced. During the photometry, subject brightness of the entire picture is calculated from brightness (Y) data and an exposure amount is calculated from the obtained subject brightness to determine a combination of an exposure time and an f-number. In addition, the AF control is commenced and the focus lens composing the taking lens 13 is moved to detect the focal position where the contrast becomes the maximum. The focus lens is set to the detected focal position.

Upon full depression of the shutter button 15 (turning on a switch S2), regular shooting is performed. At the time of the regular shooting, the stop is set to the f-number determined by the AE photometry and charges of the CCD 34 are compulsory drained. After that, photoelectrical conversion of the CCD 34 is commenced. When the exposure time has passed, a shutter is actuated to halt the photoelectrical conversion of the CCD 34.

After closing the shutter, a frame image is read out of the CCD 34 and is sent to the image-signal processing circuit 37 via the CDS/AMP circuit 35 and the A/D converter 36. The image processes (A/D conversion, gamma conversion, white balance, sharpness processing, YC conversion and so forth) are performed in the image-signal processing circuit 37. The processed frame image is written in the SDRAM 38. And then, image data of the frame image is read out of the SDRAM 38 and is compressed by a companding circuit 40 in a predetermined compression format of JPEG format and so forth. The compressed image data is recorded in the memory card 18 via a media controller 41. When the subject brightness is lower than a predetermined threshold, the system controller 26 drives a flash emitting circuit 44 to activate the flash emitter 14.

The lens barrel 12 includes a correction lens 13a for correcting the shake as one of lenses composing the taking lens 13. A hall element 22 is disposed near the correction lens 13a. An output of the hall element 22 is inputted into a position detector 33. Further, the lens barrel 12 includes an actuator 42 for moving the correction lens 13a in a direction perpendicular to an imaging optical axis. The actuator 42 is driven by a drive circuit 43 to move the correction lens 13a so that an optical path of the taking lens 13 is deflected.

The system controller 26 activates the drive circuit 43 on the basis of the shake amount of the electronic camera 10, which is calculated by the integral processing circuit 32, and a lens position signal of the position detector 33 to move the correction lens 13a in a direction and at a speed so as to offset the shake.

Figure 4:
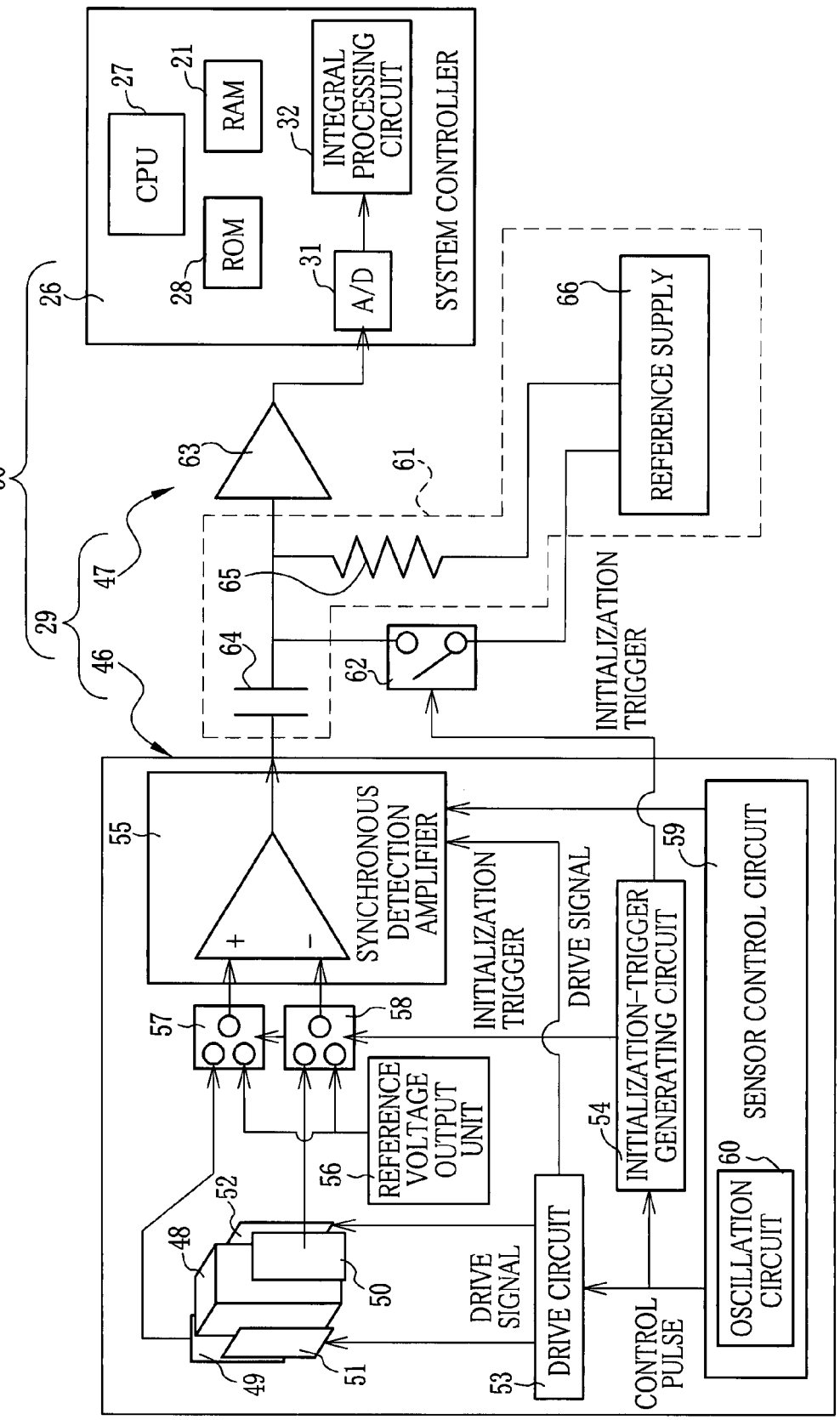
FIG. 4 is a block diagram showing a structure of a shake-amount detecting device of the first embodiment according to the present invention.

The shake detector 29 comprises a gyro sensor 46 and an external processing circuit 47 as shown in FIG. 4 in detail. The gyro sensor 46 comprises a prism-shaped oscillator 48, piezoelectric elements 49 and 50 for detection, piezoelectric elements 51 and 52 for oscillation, a drive circuit 53, an initialization-trigger generating circuit 54, a synchronous detection amplifier 55, a reference-voltage output unit 56, selector switches 57 and 58, and a sensor control circuit 59. The piezoelectric elements 49 and 50 confront opposite two sides of the oscillator 48. The piezoelectric elements 51 and 52 confront remaining two sides of the oscillator 48, which are adjacent to the sides thereof confronting the piezoelectric elements 49 and 50. The drive circuit 53 activates the piezoelectric elements 51 and 52. The sensor control circuit 59 controls the respective parts. Incidentally, FIG. 4 shows a structure in that the shake amount of one direction is detected by the sole gyro sensor 46. However, for the purpose of detecting the shake amounts of two directions of x-axis and y-axis, another similar gyro sensor may be provided so as to be disposed such that a detection direction thereof is perpendicular to that of the gyro sensor 46.

In this embodiment, the angular velocity of the camera body 11 is detected by the gyro sensor 46 of piezoelectric-type, and the oscillator 48, the piezoelectric elements 49 to 52 and the drive circuit 53 constitute an angular velocity sensor. It is however possible in the present invention to use an inertia-type gyro sensor having a rotor, or a gyro sensor using MEMS, instead of the piezoelectric-type gyro sensor 46, to measure the angular velocity. It is also possible to use an angular acceleration sensor to calculate the angular velocity of the camera body 11.

The sensor control circuit 59 is provided with an oscillation circuit 60 for oscillating a control pulse having a predetermined frequency. For example, the control pulse of 8 kHz is inputted from the oscillation circuit 60 into both of the drive circuit 53 and the initialization-trigger generating circuit 54. And then, the drive circuit 53 into which the control pulse has been inputted sends a drive signal to the piezoelectric elements 51 and 52 in synchronization with timing of the control pulse. Upon applying the drive signal of the drive circuit 53 to the piezoelectric elements 51 and 52, these elements 51 and 52 excites the oscillator 48. In this state, the oscillator 48 rotates. By Coriolis force corresponding to a rotation angular velocity, an output voltage is generated. The generated output voltage is outputted from the piezoelectric elements 49 and 50. By the way, this output voltage includes drift components. Meanwhile, the above-mentioned drive signal is also inputted into the synchronous detection amplifier 55. By virtue of this, the synchronous detection amplifier 55 is actuated substantially in synchronization with the piezoelectric elements 49 and 50.

The initialization-trigger generating circuit 54 into which the control pulses of the sensor control circuit 59 are inputted generates an initialization trigger whenever the control pulses are counted by a prescribed number. The generated initialization trigger is outputted to the synchronous detection amplifier 55 and the external processing circuit 47 described later. Meanwhile, the reference-voltage output unit 56 outputs a second reference voltage, which is set to 2.5V for instance.

As to the selector switches 57 and 58, input sides thereof are normally connected to the piezoelectric elements 49 and 50 to input the voltages of the piezoelectric elements 49 and 50, which are outputted in accordance with the drive signal, into the synchronous detection amplifier 55. When the initialization trigger is inputted, the selector switches 57 and 58 change the connections of the input sides from the piezoelectric elements 49 and 50 to the reference-voltage output unit 56 to input the second reference voltage, which is outputted from the reference-voltage output unit 56, into the synchronous detection amplifier 55.

The synchronous detection amplifier 55 comprises a differential amplifier and a sample-hold circuit to normally output an amplified signal produced by sampling, holding and differentially amplifying the output voltages of the piezoelectric elements 49 and 50. When the initialization trigger is inputted into the selector switches 57 and 58, a first zero-level signal produced by differential amplifier of the second reference voltage is outputted. This first zero-level signal has a reference signal value to be outputted at a time when the camera body comes to rest (the angular velocity is zero). For instance, the zero-level signal is 2.5V, which is a center value of an output range 0V to 5V of the synchronous detection amplifier 55.

The external processing circuit 47 comprises a high-pass filter 61, a zero-level initialization switch 62 and an amplifier 63. The high-pass filter 61 comprises a capacitor 64, a resistance 65 and a reference supply 66. This reference supply 66 outputs a first reference voltage of 2.5V, for instance. The capacitor 64 is connected to an output side of the synchronous detection amplifier 55. The resistance 65 is connected between the capacitor 64 and the reference supply 66. The zero-level initialization switch 62 is connected in parallel to the resistance 65 and short-circuits the resistance 65 when turned on. The amplified signal outputted from the synchronous detection amplifier 55 is inputted into the amplifier 63 through the high-pass filter 61.

The zero-level initialization switch 62 is turned on upon an input of the initialization trigger to initialize the high-pass filter 61. In accordance with the initialization of the high-pass filter 61, the second zero-level signal is outputted. In other words, since the resistance 65 is short-circuited, the first reference voltage of the reference supply 66 appears at a connection point of the capacitor 64 and the resistance 65 as the second zero-level signal. This second zero-level signal corresponds to a signal to be outputted from the high-pass filter 61 at the time when the angular velocity of the camera body 11 is zero (rest state). Consequently, both the first zero-level signal and the second zero-level signal have the reference signal value to be outputted at the rest state. In this embodiment, the first and second zero-level signals are 2.5V.

In this way, during the initialization of the high-pass filter 61, the first zero-level signal of the synchronous detection amplifier 55 is inputted into the high-pass filter 61 and the second zero-level signal is outputted from the high-pass filter 61. Thus, the reference signal value is applied to both electrodes of the capacitor 64 so that the zero level fluctuating due to the drift component and so forth is calibrated and the high-pass filter 61 is set to the reference signal value. By virtue of the initialized high-pass filter 61, the drift component is removed and only the accurate amplified signal is outputted in accordance with the angular velocity. The amplified signal having passed through the high-pass filter 61 is amplified by the amplifier 63 and is outputted to the A/D converter 31 of the system controller 26. Incidentally, a gain of the amplifier 63 is set to fifty times, for instance.

Figure 5:
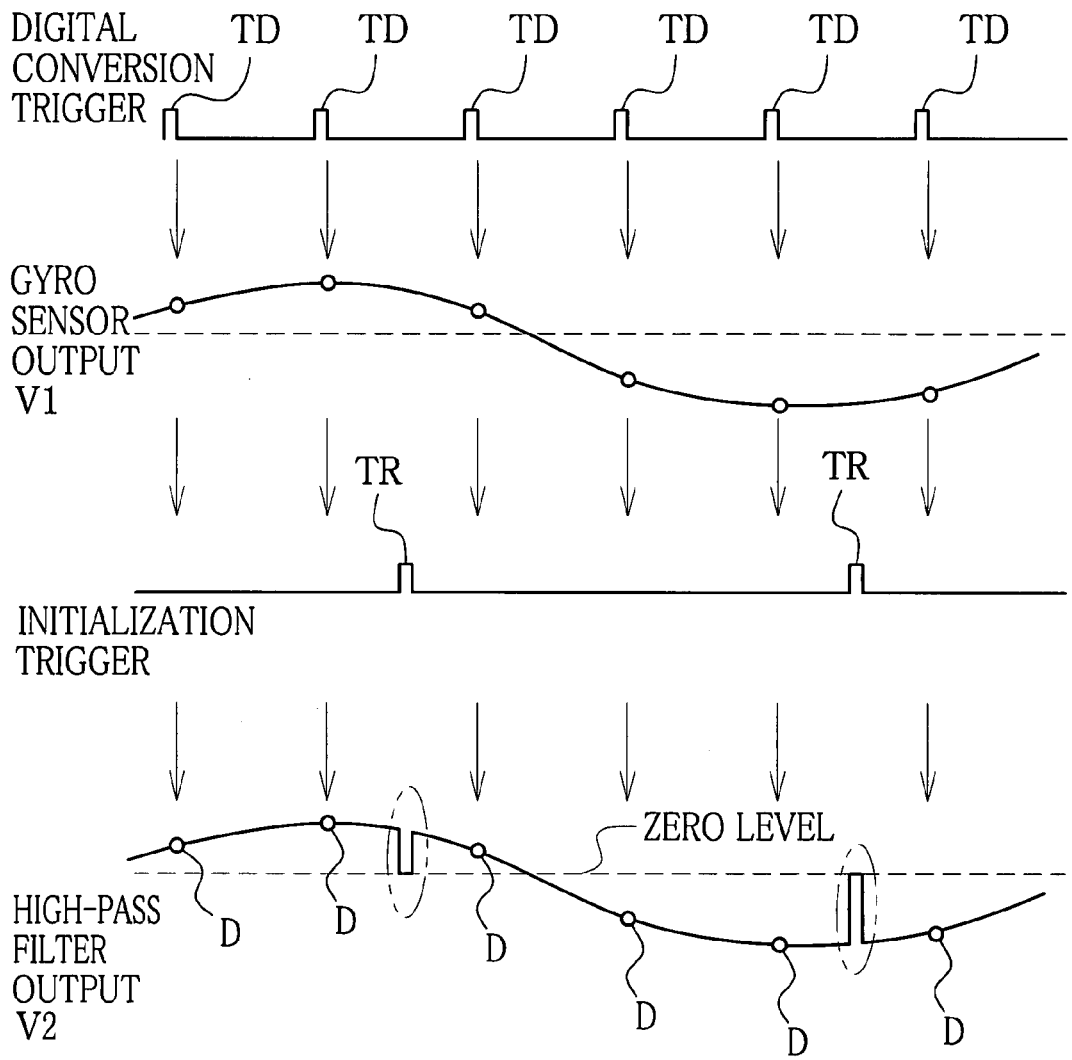
FIG. 5 is a timing diagram showing output timing of initialization trigger and digital conversion in the first embodiment.

In this embodiment, the control pulse, the output V1 of the gyro sensor 46, the output V2 of the high-pass filter 61, a digital conversion trigger TD and the initialization trigger TR have relationships shown in FIG. 5. The initialization trigger TR is outputted first from the initialization-trigger generating circuit 54 whenever the control pulses of the sensor controller circuit 59 are counted by the prescribed number (by three times in this embodiment). The output V1 of the gyro sensor is outputted through the high-pass filter 61. In response to the initialization trigger TR, the high-pass filter 61 is initialized to reset the zero level thereof (a region shown by a two-dot chain line). Meanwhile, the digital conversion trigger TD is outputted to the A/D converter 31 substantially in synchronization with the control pulse to convert the amplified signal, which has passed through the high-pass filter 61, into a digital signal D.

Figure 6:
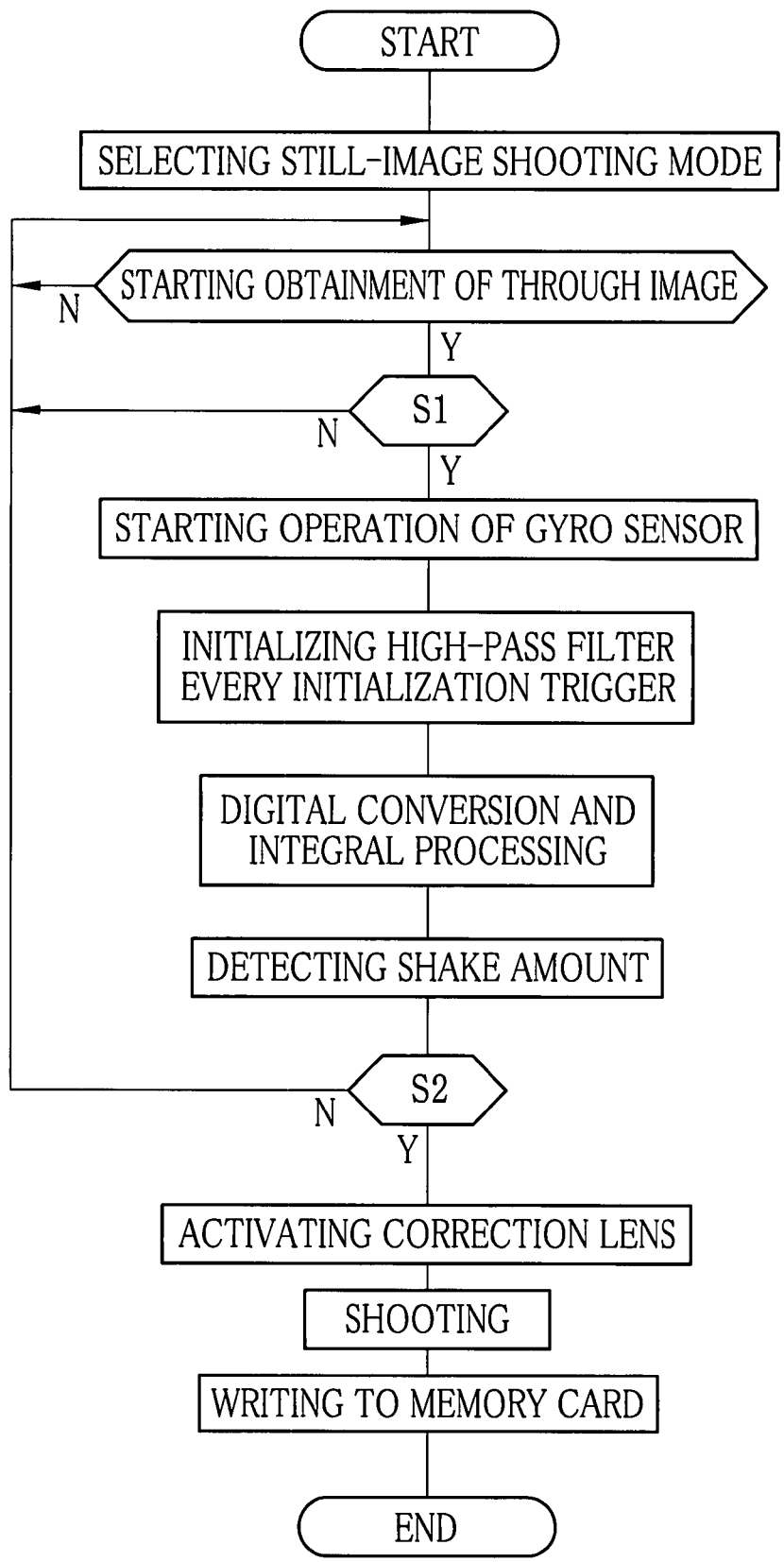
FIG. 6 is a flowchart showing a procedure for shake-amount detection and shake correction.

An operation of the electronic camera 10 having the above structure is described below with reference to a flowchart shown in FIG. 6. In taking a still image with the electronic camera 10, the operation dial 16 is handled first to turn on the power supply of the electronic camera 10 and to select the still-image shooting mode. Upon this, obtaining the through image is commenced.

Framing is performed while the through image displayed on the LCD 20 is viewed. Upon pressing the shutter button 15 halfway, a combination of the stop and the shutter speed is determined by the AE photometry and ranging for AF is performed. In addition, detecting the shake by the shake detector 29 is commenced.

As described above, in detecting the shake by the shake detector 29, the piezoelectric elements 51 and 52 are activated from when the operation of the gyro sensor 46 has been commenced. In other words, the piezoelectric elements 51 and 52 are activated by the drive signal sent from the drive circuit 53 in accordance with the control pulse of the sensor control circuit 59. The initialization trigger is outputted form the trigger generating circuit 54. The synchronous detection amplifier 55 normally outputs the amplified signal produced by amplifying the output signals of the piezoelectric elements 49 and 50. The synchronous detection amplifier 55 outputs the first zero-level signal when the initialization trigger is inputted.

The amplified signal inputted into the external processing circuit 47 from the synchronous detection amplifier 55 is outputted via the high-pass filter 61. The zero-level signal of the high-pass filter 61 is initialized so as to be set to the reference signal value whenever the initialization trigger is inputted. By virtue of this, the drift components included in the output voltages of the piezoelectric elements 49 and 50 are corrected whenever the initialization trigger is inputted, so that only the amplified signal corresponding to the angular velocity of the electronic camera 10 is outputted from the high-pass filter 61. The amplified signal having passed through the high-pass filter 61 is digitally converted by the A/D converter 31, and the integral processing circuit 32 performs the time integration for the converted signal to detect the accurate shake amount.

Successively, the shutter button 15 is fully pressed. Upon this, the system controller 26 inputs the integral value calculated by the integral processing circuit 32, namely inputs the shake amount of the electronic camera 10 into the drive circuit 43. The shake amount of the electronic camera 10 is regarded as a target position and the drive circuit 43 calculates a difference between the target position and the lens position detected by the position detector 33. Feedback drive is performed for the correction lens 13a so as to make the difference zero. Thus, the optical path of the taking lens 30 is deflected in a direction and at a speed so as to offset the shake. At the same time, setting of the stop and photoelectrical conversion of the CCD 34 are performed. Further, the regular shooting is performed in association with the shutter operation. The frame image taken in the regular shooting is compressed after various kinds of image processing and is recorded in the memory card 18. The shake amount is detected with great accuracy as described above and the regular shooting is performed after correcting the shake in accordance with the shake amount so that an image without the shake is obtained by the electronic camera 10 of this embodiment.

Figure 7:
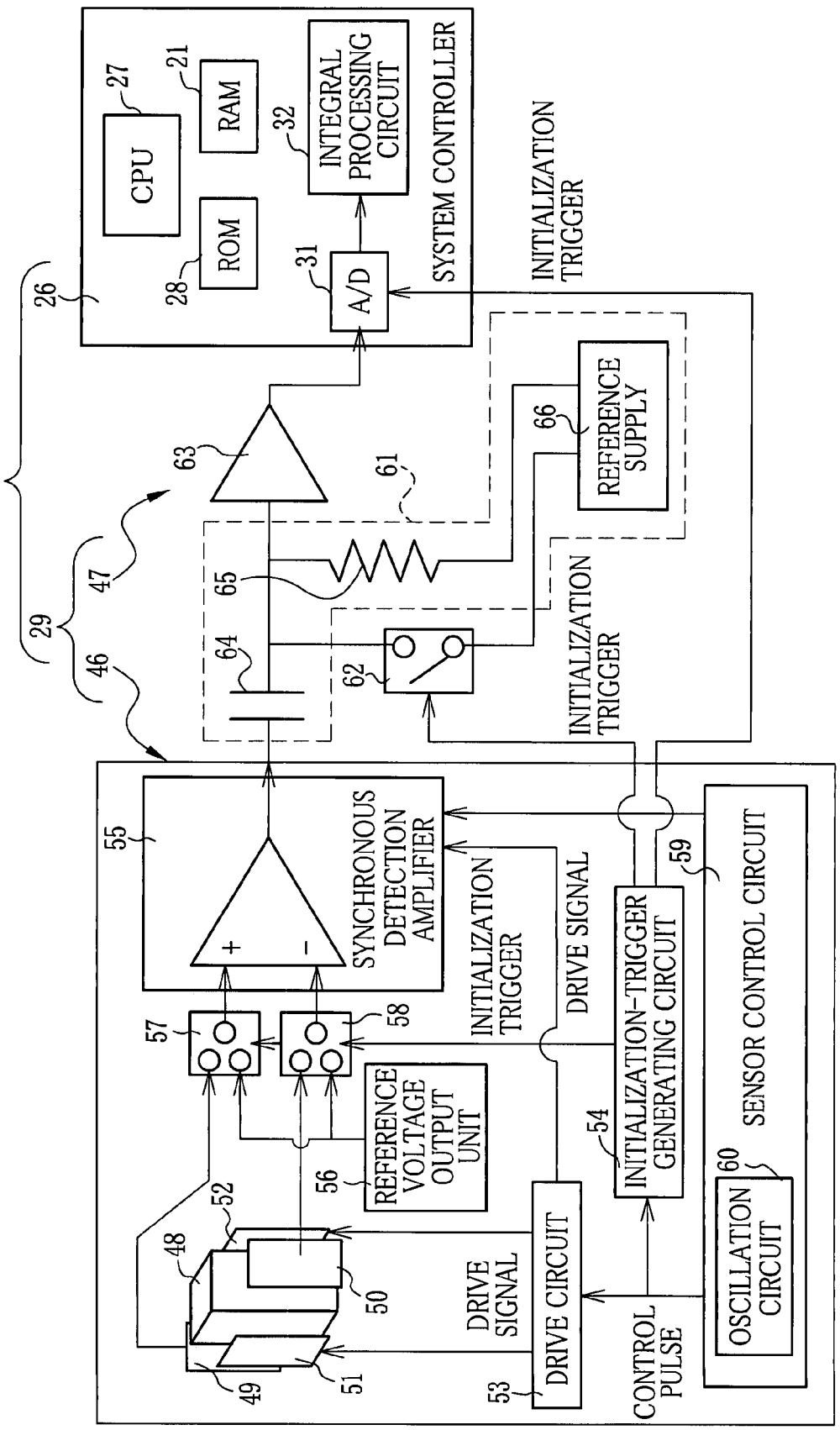
FIG. 7 is a block diagram showing a structure of the shake-amount detecting device of a modified embodiment of the first embodiment.
Figure 8:
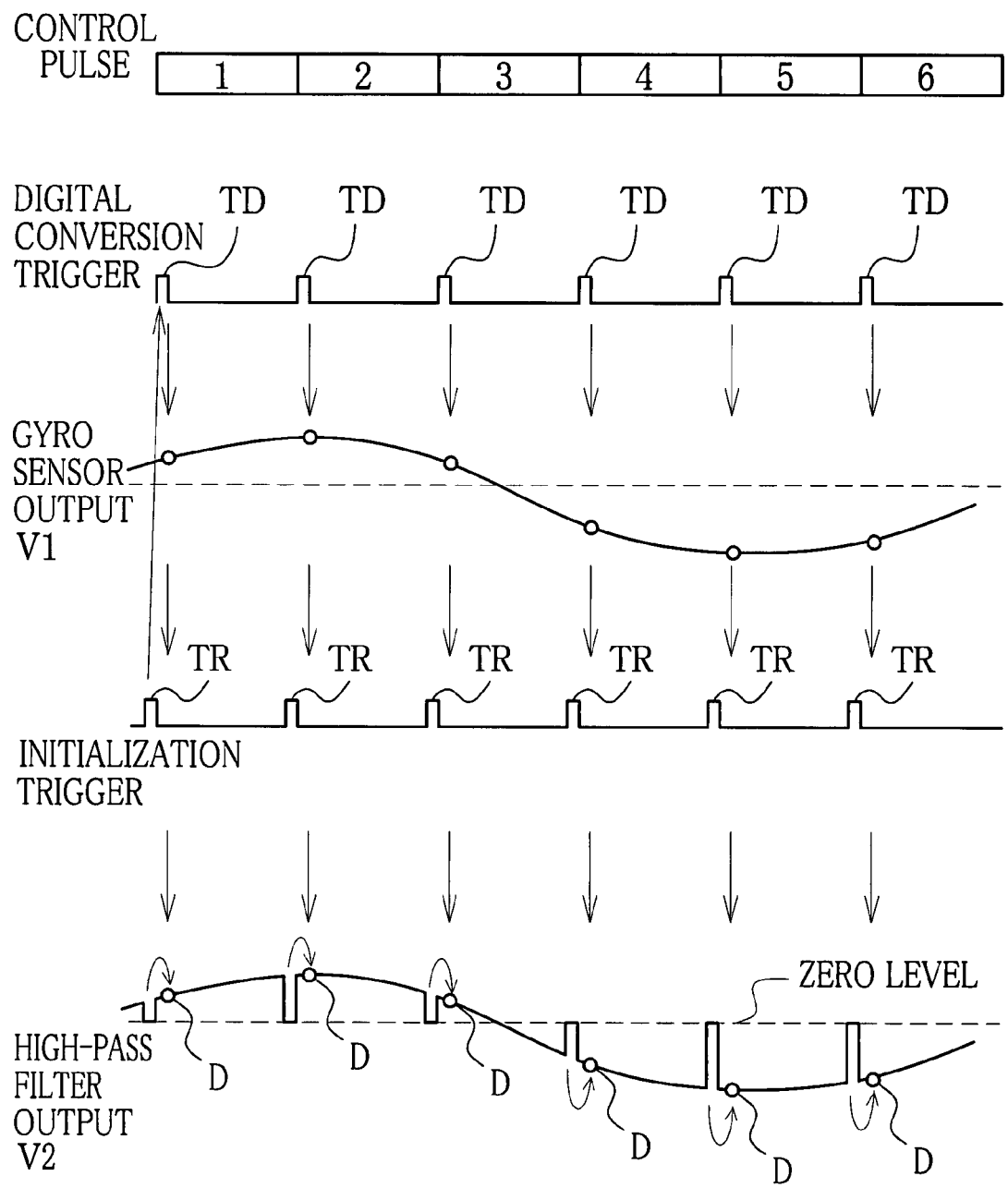
FIG. 8 is a timing diagram showing output timing of the initialization trigger and the digital conversion of the modified embodiment of the first embodiment.

As a modified embodiment of the above embodiment, the initialization trigger, which is outputted from the initialization-trigger generating circuit 54, may be inputted into the A/D converter 31 such as shown in FIG. 7 to digitally convert the amplified signal at the input time of the initialization trigger, or substantially in synchronization with the timing for initializing the high-pass filter 61. By the way, in this case, the digital conversion trigger TD is outputted just after the initialization trigger TR as shown in FIG. 8. The drift correction of the amplified signal is performed by the initialization process every initialization trigger TR. In addition, the digital signal D produced by digitally converting the amplified signal is obtained every initialization trigger TR. Since the time integration is performed for the digital signal, it is possible to detect the shake amount with greater accuracy.

Figure 9:
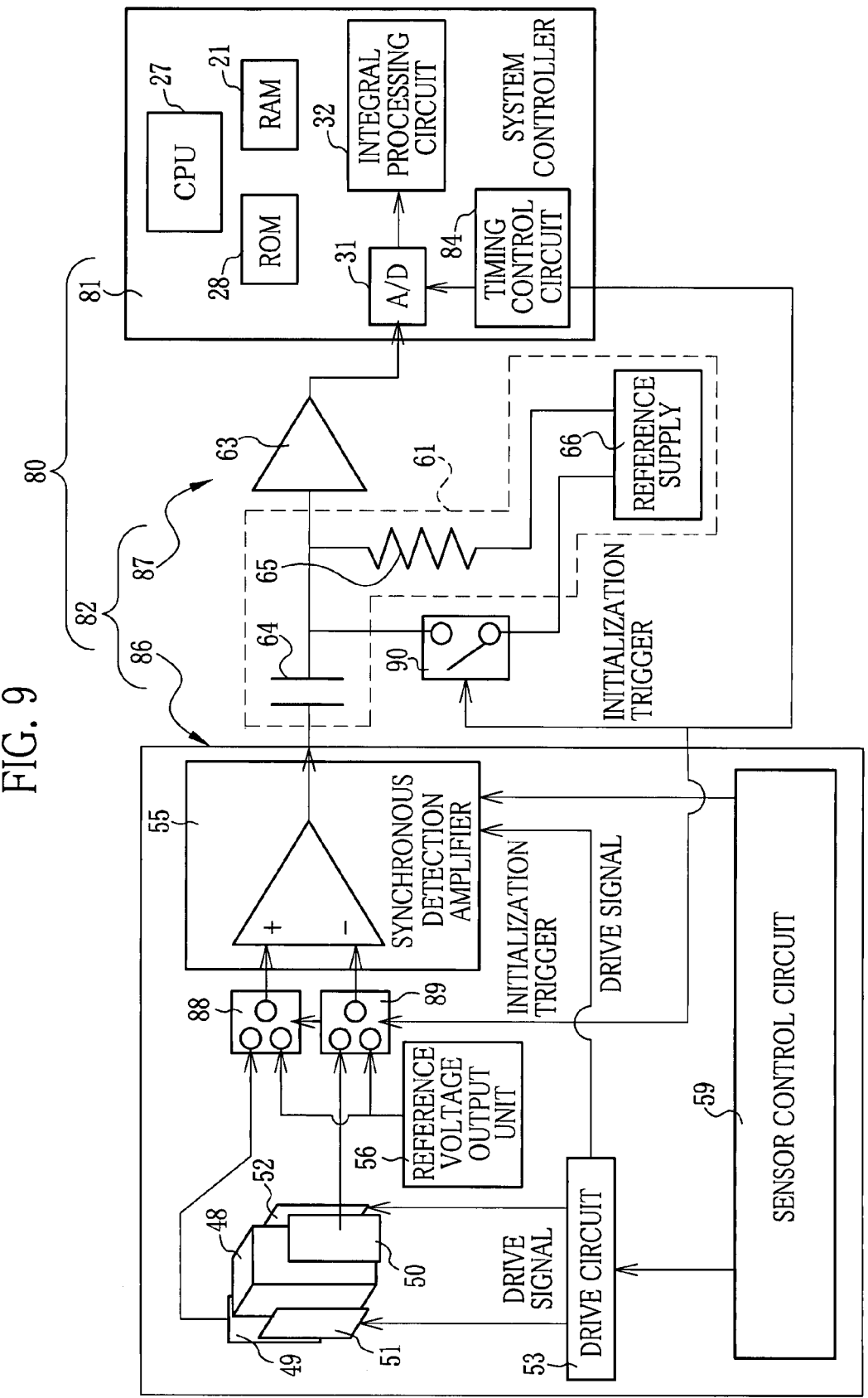
FIG. 9 is a block diagram showing a structure of the shake-amount detecting device of the second embodiment.

In the above embodiment, the initialization processing and so forth are executed in synchronization with the initialization trigger generated from the initialization-trigger generating circuit provided inside the gyro sensor. The present invention, however, is not limited to this. The second embodiment of the present invention described below relates to a structure in that the initialization trigger is generated from the system controller to synchronize the various kinds of processing. The electronic camera according to the second embodiment has the structure of a block diagram shown in FIG. 9. As shown in FIG. 9, a shake-amount detecting device 80 comprises a system controller 81 and a shake detector 82. Incidentally, when a part identical with that of the above first embodiment is employed, this part is denoted by the same reference numeral and description thereof is omitted. Meanwhile, when the shake-amount detecting device 80 is built in the electronic camera, part formation of the electronic camera is identical with the above first embodiment except for the shake-amount detecting device 80. For this reason, description of the identical part formation is omitted.

The system controller 81 comprises the CPU 27 as a main part, the A/D converter 31, the integral processing circuit 32 and a timing control circuit 84. A signal corresponding to the angular velocity of the camera body detected by the shake detector 82 is inputted into the A/D converter 31 and is digitally converted therein. For the digitally-converted signal, the integral processing circuit 32 performs the time integration. The timing control circuit 84 controls operation timing for detecting the shake.

The shake detector 82 comprises a gyro sensor 86 and an external processing circuit 87. The gyro sensor 86 comprises the oscillator 48, the piezoelectric elements 49 and 50 for detection, the piezoelectric elements 51 and 52 for oscillation, the drive circuit 53, the synchronous detection amplifier 55, the reference-voltage output unit 56, selector switches 88 and 89, and the sensor control circuit 59. The external processing circuit 87 comprises the high-pass filter 61, a zero-level initialization switch 90 and the amplifier 63.

Figure 10:
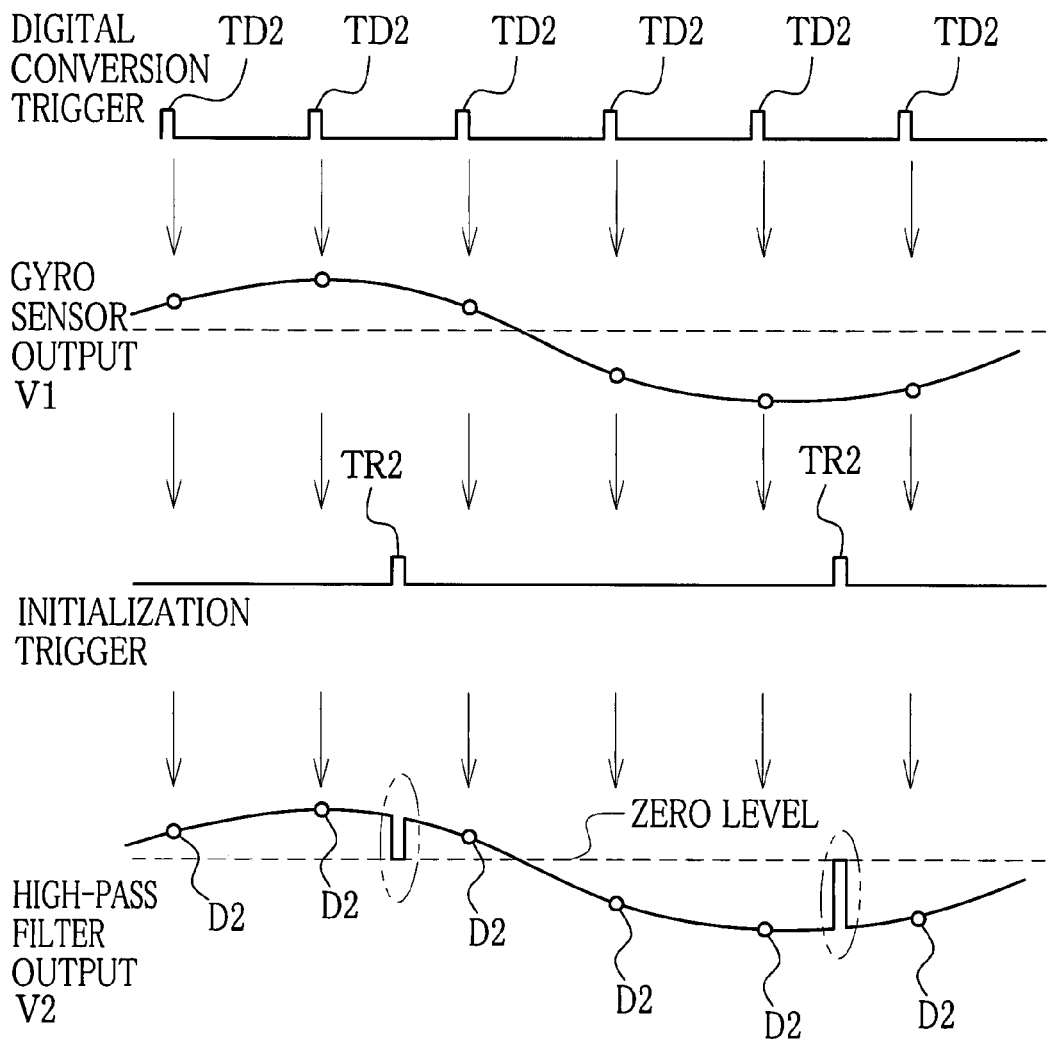
FIG. 10 is a timing diagram showing output timing of the initialization trigger and the digital conversion of the second embodiment.

In this embodiment, the timing control circuit 84 of the system controller 81 generates the digital conversion trigger to control the timing of the digital conversion processing performed by the A/D converter 31. Further, the timing control circuit 84 generates the initialization trigger to be outputted to both of the gyro sensor 86 and the external processing circuit 87. The initialization trigger is inputted into the selector switches 88, 89 and the zero-level initialization switch 90. By virtue of this, the synchronous detection amplifier 55 and the high-pass filter 61 are initialized substantially in synchronization with each other to correct the drift component. Meanwhile, FIG. 10 shows a relationship of operation timing of this embodiment. The timing control circuit 84 generates the digital conversion triggers TD2 at timing which has a plural-number-fold frequency relative to the generation timing of initialization triggers TR2 and is different from this generation timing. For example, the initialization trigger TR2 is generated so as to have a frequency of 8 kHz, and the digital conversion trigger TD2 is generated so as to have a frequency of 16 kHz to 64 kHz. Thus, a digital signal D2 is inputted into the integral processing circuit 32 by plural times whenever the initialization processing is performed by one time. The integral processing circuit 32 averages the digital signals D2 of the plural times as a sample value to perform the time integration processing.

Figure 11:
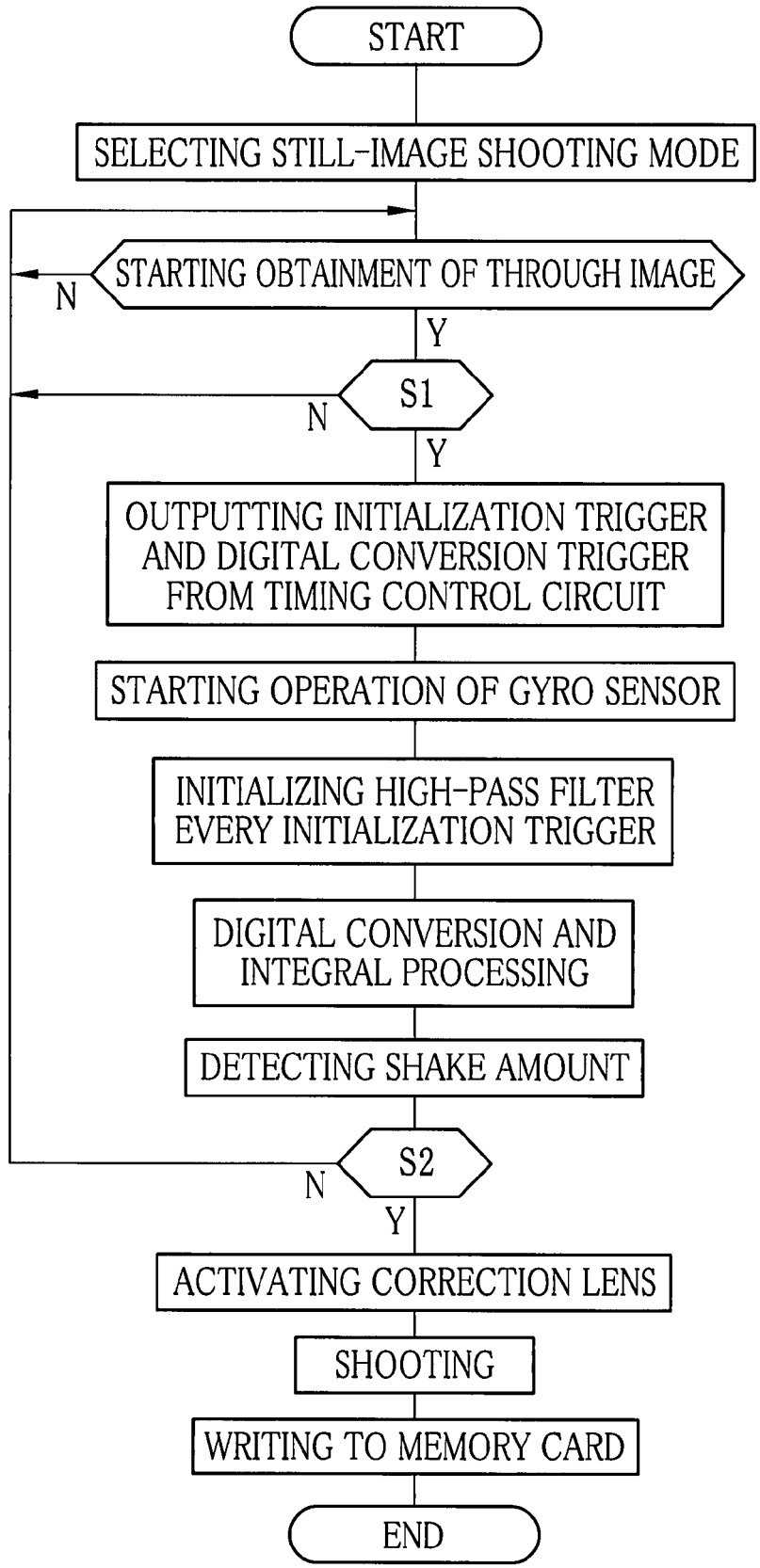
FIG. 11 is a flowchart showing a procedure for the shake-amount detection and the shake correction of the second embodiment.

An operation of this embodiment is described below with reference to a flowchart shown in FIG. 11. In taking a still image with the electronic camera into which the above-described shake-amount detecting device 80 is built, the power supply is turned on first and the still-image shooting mode is selected. After that, framing is performed while the through image displayed on the LCD is viewed, and then, the shutter button is pressed halfway. Upon this, the system controller 81 and the shake detector 82 commence to detect the shake.

As describe above, the initialization trigger is sent from the timing control circuit 84. In addition, the digital conversion trigger is sent at the different timing from the initialization trigger and at the plural-number-fold frequency of the initialization trigger. The drift correction of the amplified signal is performed by the initialization processing every initialization trigger, and the digital signal produced by digitally converting the amplified signal is obtained by plural times every initialization processing. Since the time integration operation is performed for the obtained digital signal, it is possible to detect the shake amount with great accuracy so that the image without the shake is taken.

Figure 12:
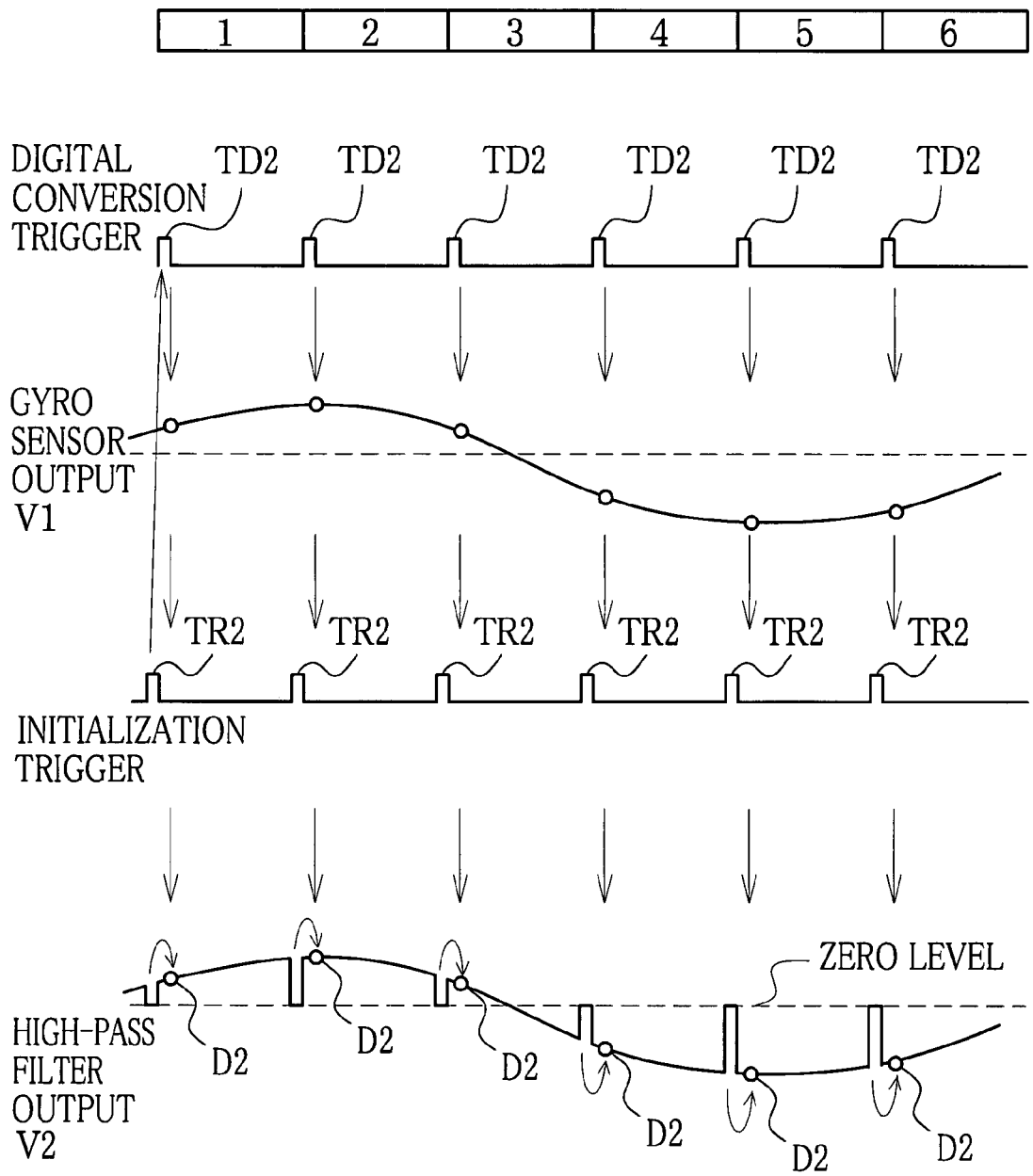
FIG. 12 is a timing diagram showing output timing of the initialization trigger and the digital conversion of a modified embodiment of the second embodiment.

In the second embodiment, the digital conversion trigger and the initialization trigger sent form the system controller are generated at the different timing and frequency. The present invention, however, is not limited to this. As a modified embodiment of the second embodiment, the initialization trigger and the digital conversion trigger may be generated substantially in synchronization with each other such as shown in FIG. 12. Incidentally, in this case, a structure of parts and so forth is identical with that of the second embodiment and description thereof is omitted. As shown in FIG. 12, the initialization trigger and the digital conversion trigger are adapted to be inputted at the same frequency and the digital conversion trigger is adapted to be inputted just after the initialization trigger. The drift correction of the amplified signal is performed by the initialization processing every initialization trigger, and just after that, the digital signal produced by digitally converting the amplified signal is obtained. Since the time integration operation is performed for the obtained digital signal, it is possible to detect the shake amount with greater accuracy.

Figure 13:
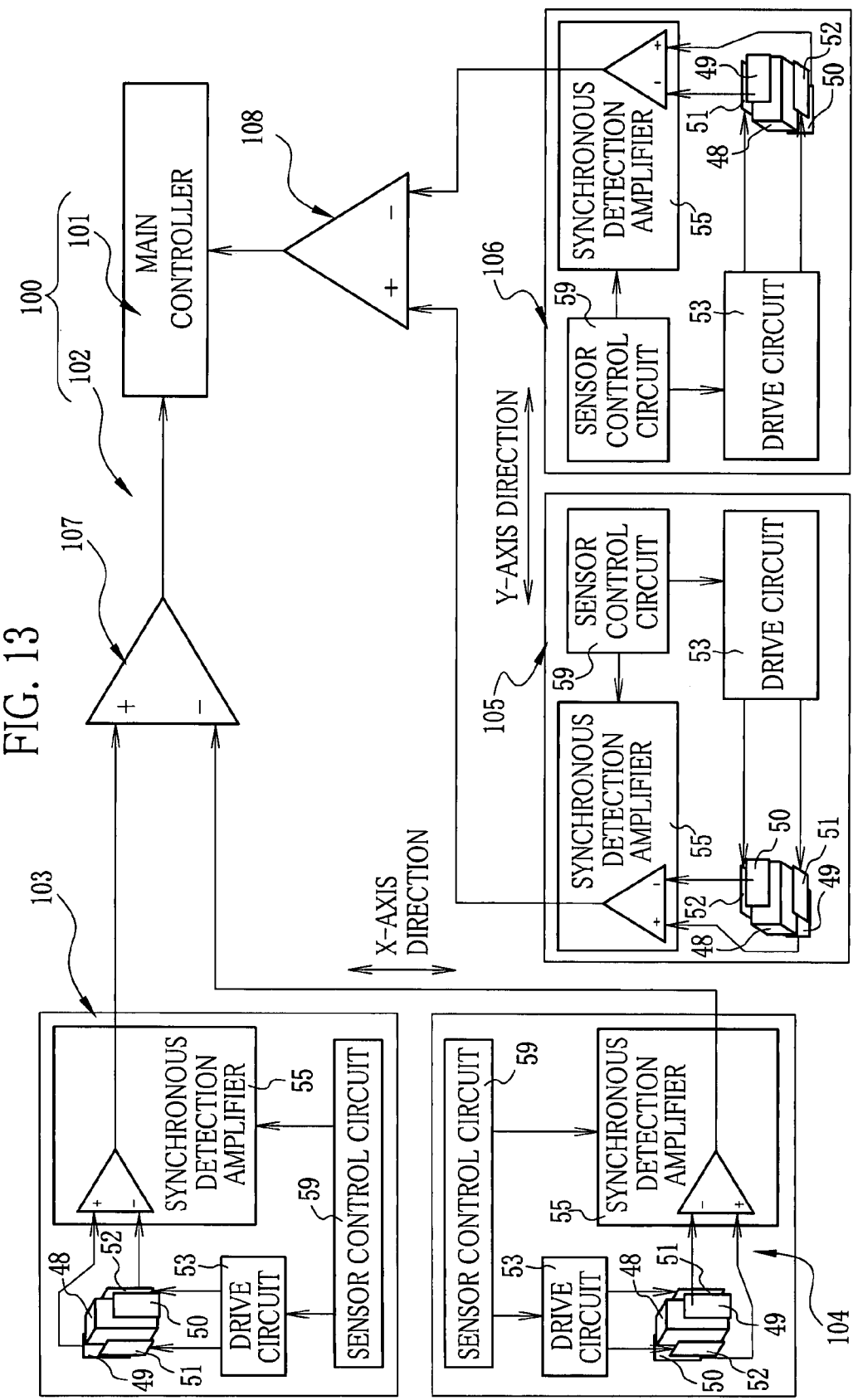
FIG. 13 is a block diagram showing a structure of the shake-amount detecting device according to the third embodiment.

In the first and second embodiments, the digital conversion processing and the integral operation are performed after initializing the shake amount detected by the shake detector and correcting the drift component of the amplified signal. The present invention, however, is not limited to this. Hereinafter, is described the third embodiment of the present invention wherein an effect identical with the first and second embodiments is obtained by disposing gyro sensors of an even number. As shown in FIG. 13, a shake-amount detecting device 100 of the third embodiment comprises a main controller 101 and a shake detector 102.

The shake detector 102 comprises two gyro sensors 103 and 104 for performing detection in an X-axis direction, two gyro sensors 105 and 106 for performing detection in a Y-axis direction, and differential amplifiers 107 and 108. Incidentally, the respective parts composing the gyro sensors 103 to 106 are identical with those of the first and second embodiments and description thereof is omitted.

The gyro sensors 103 and 104 are disposed such that detecting directions thereof are opposite to each other. Output sides of the gyro sensors 103 and 104 are connected to input sides of the differential amplifier 107 respectively having opposite polarity. Thus, as to the outputs of the respective gyro sensors 103 and 104, directions of the drift components are identical and polarities of components representing the shake state are opposite. By passing the outputs of the gyro sensors 103 and 104 through the differential amplifier 107, the respective drift components of the gyro sensors 103 and 104 are offset and only the output corresponding to the shake amount is amplified. Meanwhile, as to the gyro sensors 105 and 106, detecting directions thereof are opposite to each other and output sides thereof are connected to input sides of the differential amplifier 108 respectively having opposite polarity. By virtue of such a structure, it is possible to detect the shake amount with great accuracy in both of the X-axis direction and the Y-axis direction. Further, it is unnecessary to dispose a high-pass filter circuit and so forth for correcting the drift component on the way to the system controller including the A/D converter and the operation processing circuit. Consequently, the structure of the entire device is simplified.

Figure 14:
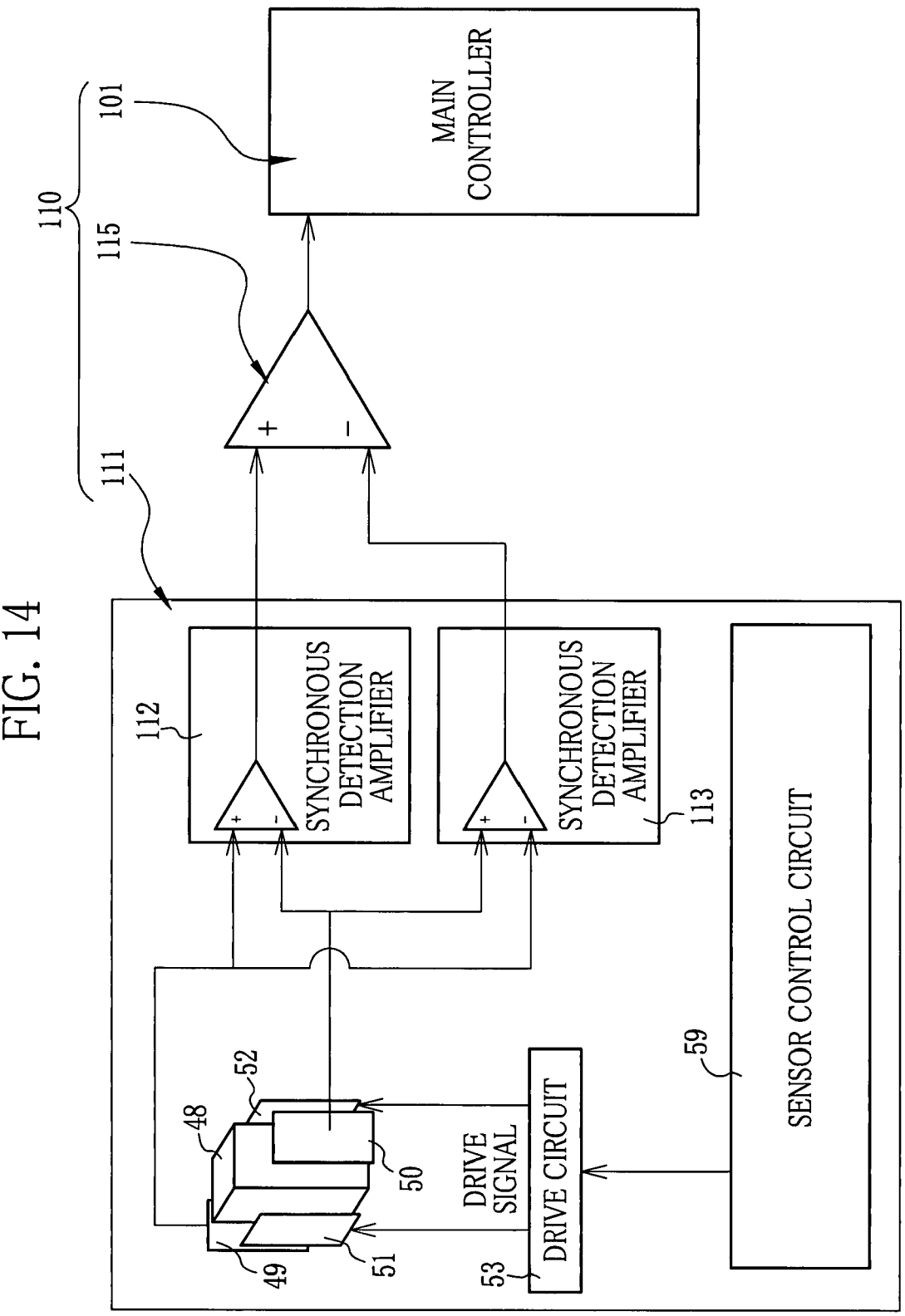
FIG. 14 is a block diagram showing a structure of the shake-amount detecting device according to the fourth embodiment.

In the third embodiment, the gyro sensors are disposed so as to make the detecting directions thereof opposite to each other. However, this is not exclusive. Such as a shake-amount detecting device 110 shown in FIG. 14, a gyro sensor 111 may include synchronous detection amplifiers of an even number, which are two amplifiers 112 and 113 in this embodiment. Output sides of two piezoelectric elements used for detection are connected to input sides of the synchronous detection amplifiers 112 and 113 so as to make polities thereof opposite to each other. The shake-amount detecting device 110 further comprises a differential amplifier 115. Output sides of the synchronous detection amplifiers 112 and 113 are connected to input sides of the differential amplifier 115 respectively having an opposite polarity. As to the outputs of the respective synchronous detection amplifiers 112 and 113, directions of the drift components are identical and polarities of components representing the shake state are opposite. By passing the outputs of the synchronous detection amplifiers 112 and 113 through the differential amplifier 115, the respective drift components of the synchronous detection amplifiers 112 and 113 are offset and only the output corresponding to the shake amount is amplified. Therefore, it is possible to obtain an effect similar to the above third embodiment.

The above-described embodiments relate to the electronic camera. The present invention, however, is not limited to this. The imaging device into which the shake-amount detecting device of the present invention is built may be a camera-equipped cell-phone, a camera-equipped PDA and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A shake-amount detecting device for detecting a shake of a housing, comprising:
   an angular velocity sensor for generating a first signal corresponding to angular velocity of said housing;
   an initialization-trigger generating circuit for generating an initialization trigger in predetermined cycles;
   a synchronous detection amplifier for outputting an amplified signal produced by amplifying said first signal of said angular velocity sensor, said synchronous detection amplifier outputting a first zero-level signal when said initialization trigger is inputted;
   a high-pass filter into which said amplified signal and said first zero-level signal, which are outputted from said synchronous detection amplifier, are inputted;
   a zero-level initialization circuit for initializing said high-pass filter every input of said initialization trigger, said high-pass filter outputting a second zero-level signal during the initialization thereof;
   an A/D converter for performing digital conversion processing to convert a second signal, which is outputted from said high-pass filter, into a digital signal; and
   an integral processing circuit for integrating said digital signal to output a shake amount of said housing.

2. The shake-amount detecting device according to claim 1, wherein said first zero-level signal and said second zero-level signal have a reference signal value to be outputted at a time when said angular velocity is zero.

3. The shake-amount detecting device according to claim 2, wherein said reference signal value is substantially a center value of an output range of said synchronous detection amplifier.

4. The shake-amount detecting device according to claim 2, wherein said high-pass filter includes:
   a capacitor connected to said synchronous detection amplifier;

a reference supply for generating a first reference voltage; and a resistance connected between said capacitor and said reference supply, a signal generated at a connection point of said resistance and said capacitor being inputted into said A/D converter, and said second zero-level signal generating at said connection point when the high-pass filter is initialized.

5. The shake-amount detecting device according to claim 4, wherein said zero-level initialization circuit is a switch connected to said resistance in parallel, said switch being turned on during the input of said initialization trigger to short-circuit said resistance, and said first reference voltage generating at said connection point as said second zero-level signal.

6. The shake-amount detecting device according to claim 5, further comprising:

a reference-voltage output unit for generating a second reference voltage;

a selector switch circuit for selecting either one of said first signal of said angular velocity sensor and said second reference voltage of said reference-voltage output unit to input the selected one into said synchronous detection amplifier, which outputs said first zero-level signal when said second reference voltage is inputted.

7. The shake-amount detecting device according to claim 2, wherein said A/D converter is synchronized with the initialization trigger to perform said digital conversion processing just after the second zero-level signal outputted from said high-pass filter has been stopped.

8. The shake-amount detecting device according to claim 2, wherein a gyro sensor, a sensor external processing circuit and a system controller are included, said gyro sensor having said initialization-trigger generating circuit, said angular velocity sensor and said synchronous detection amplifier, said sensor external processing circuit having said high-pass filter and said zero-level initialization circuit, said system controller having said A/D converter and said integral processing circuit.

9. The shake-amount detecting device according to claim 8, wherein said A/D converter is synchronized with the initialization trigger to perform said digital conversion processing just after the second zero-level signal outputted from said high-pass filter has been stopped.

10. The shake-amount detecting device according to claim 2, wherein a gyro sensor, a sensor external processing circuit and a system controller are included, said gyro sensor having said angular velocity sensor and said synchronous detection amplifier, said sensor external processing circuit having said high-pass filter and said zero-level initialization circuit, said system controller having a timing control circuit, said A/D converter and said integral processing circuit, said timing control circuit generating a timing signal for performing the digital conversion processing of said A/D converter, and in addition, said timing control circuit also working as said initialization-trigger generating circuit for generating said initialization trigger.

11. The shake-amount detecting device according to claim 10, wherein said timing control circuit generates said timing signal for the digital conversion processing differently from the generation of said initialization trigger for initializing said high-pass filter.

12. The shake-amount detecting device according to claim 10, wherein said timing control circuit generates the initialization trigger to initialize said high-pass filter, and generates said timing signal to perform the digital conversion processing just after said second zero-level signal outputted from said high-pass filter has been stopped.

13. An imaging device having a camera body, comprising:

an angular velocity sensor for generating a first signal corresponding to angular velocity of said camera body;

an initialization-trigger generating circuit for generating an initialization trigger in predetermined cycles;

a synchronous detection amplifier for outputting an amplified signal produced by amplifying said first signal of said angular velocity sensor, said synchronous detection amplifier outputting a first zero-level signal when said initialization trigger is inputted;

a high-pass filter into which said amplified signal and said first zero-level signal, which are outputted from said synchronous detection amplifier, are inputted;

a zero-level initialization circuit for initializing said high-pass filter every input of said initialization trigger, said high-pass filter outputting a second zero-level signal during the initialization thereof;

an A/D converter for performing digital conversion processing to convert a second signal, which is outputted from said high-pass filter, into a digital signal;

an integral processing circuit for integrating said digital signal to output a shake amount of said camera body;

an imaging optical system having a correction lens capable of moving in a direction perpendicular to an optical axis;

a lens-position detector for detecting a position of said correction lens; and a lens drive controller for moving said correction lens, said lens drive controller calculating a difference between a target position corresponding to said shake amount and a lens position detected by said lens-position detector, and said lens drive controller moving said correction lens so as to make the difference zero.

14. The imaging device according to claim 13, wherein said first zero-level signal and said second zero-level signal have a reference signal value to be outputted at a time when said angular velocity is zero.

* * * * *